United States Patent

[11] 3,603,486

| [72] | Inventors | J. Clark Fickle<br>Moline;<br>Paul Julius Thornbloom, East Moline;<br>Arnold Burton Skromme, Moline, all of, Ill. |
|---|---|---|
| [21] | Appl. No. | 794,951 |
| [22] | Filed | Jan. 29, 1969 |
| [45] | Patented | Sept. 7, 1971 |
| [73] | Assignee | Deere & Company<br>Moline, Ill. |

[54] ENDGATE AND ENDGATE CLOSURE MECHANISM FOR A MATERIAL UNLOADER
20 Claims, 2 Drawing Figs.

[52] U.S. Cl. ................................................. 222/311,
222/331, 222/556, 239/669
[51] Int. Cl. ....................................................... A01c 15/16
[50] Field of Search ........................................ 222/330,
331, 487, 556, 311; 239/669, 679

[56] References Cited
UNITED STATES PATENTS
| 1,157,709 | 10/1915 | Maher ........................... | 222/556 X |
| 3,126,133 | 3/1964 | Richardson .................... | 222/556 X |
| 3,163,336 | 12/1964 | Henningsen ................... | 222/505 |
| 3,176,884 | 4/1965 | Klouda .......................... | 222/263 |
| 3,136,556 | 6/1964 | Wilkes et al. .................. | 239/679 X |

Primary Examiner—Robert B. Reeves
Assistant Examiner—Frederick R. Handren
Attorneys—H. Vincent Harsha, Harold M. Knoth, William A. Murray and John M. Nolan ABSTRACT: An endgate for conventional manure spreader box which is mounted adjacent the beater and includes a rear and bottom pivotally mounted doors. A spring biased latch is provided to hold each door closed against the force of gravity tending to open them and a single cable extends from the latches to the front of the spreader box to be pulled by the operator to release the latches for selectively allowing the rear door to open for providing additional clearance for the beater and for allowing the bottom door to open to enable the spreader box or conveyor to expel the last of the material from the spreader box.

INVENTORS
J. C. FICKLE
P. J. THORNBLOOM
A. B. SKROMME

BY William A. Murray

ATTORNEY

ENDGATE AND ENDGATE CLOSURE MECHANISM FOR A MATERIAL UNLOADER

BACKGROUND OF THE INVENTION

This invention relates to an endgate for a manure spreader box and more particularly relates to an endgate which includes rear and bottom pivotally mounted doors and closure mechanisms which normally hold the doors closed and which are operable for selectively permitting the doors to open.

Spreader box and endgates of a type wherein the entire endgate is pivotally mounted at the rear of the spreader box and wherein closure mechanisms are provided for holding the endgate in a closed position and are operable for permitting the doors to open are known. Two examples of such endgates are those disclosed in U.S. Pat. No. 3,163,336 granted to Henningsen on Dec. 29, 1964 and U.S. Pat. No. 3,176,884 granted to Klouda on Apr. 6, 1965.

The above noted patented endgates have the disadvantages of being bulky, requiring considerable manual effort to close them and of not being versatile in that no provision is made for providing additional beater clearance while keeping the bottom portion of the endgate in the closed position with respect to the ends of the spreader box.

SUMMARY OF THE INVENTION

According to the present invention, an improved endgate is provided which includes rear and bottom pivotally mounted doors.

Another object is to provide latch mechanisms for each of the doors, which are remotely controllable.

A further object is to provide a single flexible member, such as a cable, for controlling the latches for the doors and to construct the latches such that the latch to the rear door will release the rear door before the latch to the bottom door releases the bottom door.

These and other objects will become apparent from the following description and accompanying drawings.

DESCRIPTION OF THE PREFERRED EMBODIMENT

Figure 1:
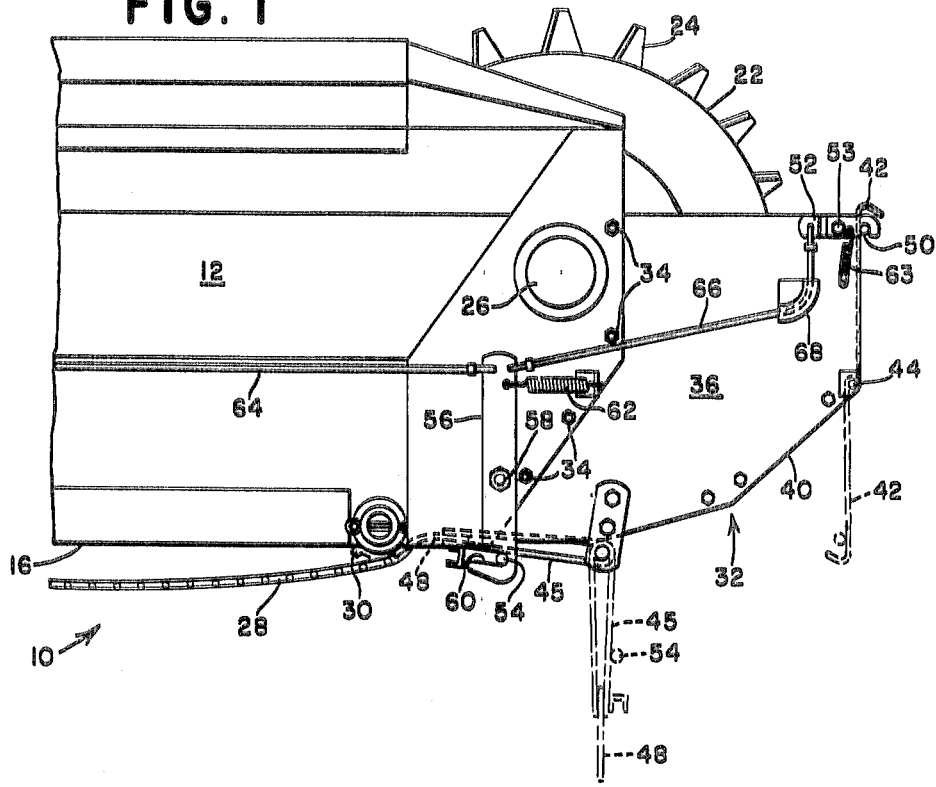
FIG. 1 is a side view showing the rear portion of a manure spreader box and showing the endgate with the doors closed in full lines and opened in dash lines.
Figure 2:
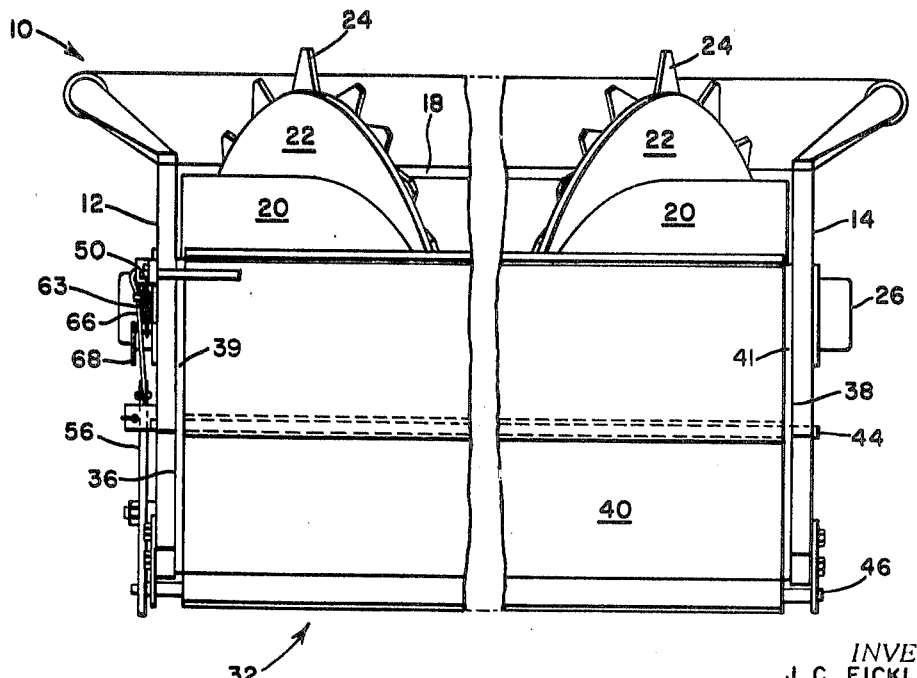
FIG. 2 is a rear view of the manure spreader shown in FIG. 1.

Referring now to the drawing, there is provided a spreader box 10 having oppositely disposed fore-and-aft extending sidewalls 12, 14 interconnected at their lower edges by floor 16 and at the front by an upright transverse wall 18. The rear end of the spreader box is left open to provide a material discharge outlet. Disposed across the open rear end is a beater 20 for contacting material feeding rearwardly and for strewing the material both laterally outwardly and rearwardly of the spreader box 10. For this purpose the beater 20 includes flights 22 which carry teeth 24 and is fixed on a horizontal transverse drive shaft 26 rotatably supported at its opposite ends by the sidewalls 12, 14. Material is fed through the beater 20 by means of the upper run of a floor conveyor 28 which is of conventional structure having a pair of transversely spaced chains interconnected by flights that engage the undersurface of the material. The chains of the conveyor are carried on sprockets, one of which is shown at 30, at the front and rear of the spreader box 10.

An endgate 32 is connected to the rear ends of the sidewalls 12, 14 by means of bolts 34. The endgate 32 includes oppositely disposed panels 36, 38 which extend rearwardly beyond the beater 20 and terminate in vertical rear edges 39, 41 having upper and lower corners respectively located above and below the horizontal level of the drive shaft 26. The panels 36, 38 are interconnected at their lower edges by a bottom wall 40 which is spaced rearwardly of the end of the spreader box and is inclined generally upwardly to the lower corners of the rear edges 39, 41. The endgate 32 is closed along its rear edges 39, 41 by a door 42 pivotally mounted on a transversely extending rod 44 extending between the panels 36, 38 adjacent the rear edge of the bottom portion 40. The portion of the endgate between the rear of the spreader box 10 and the forward edge of the bottom portion 40 is closed by a door 45 pivotally mounted on a rod 46 extending between the panels 36 and 38 adjacent the forward edge of the bottom portion 40. The door 45 includes a rubber flap 48 which, when the door is closed, extends across the rear edge of the spreader box floor to provide a seal for preventing leakage of semiliquid material from the spreader box.

The rear door 42 of the endgate 32 carries a latch pin 50 which extends transversely beyond the side panel 36 and a latch member 52 is pivoted on a bolt 53 carried by the panel 36 and is notched to receive the latch pin 50. A tension spring 63 is provided for biasing the notch into engagement with pin 50. The bottom door 44 similarly carries a latch pin 54 and a latch member 56 is pivoted on a bolt 58 carried by the sidewall 12 of the spreader box and includes a notch 60 for receiving the latch pin 54. A tension spring 62 is provided for biasing the notch 60 into engagement with the pin 54.

A cable 64 is connected to the latch member 56 and extends forwardly to the front of the spreader where it is positioned within easy grasp of the operator. A short segment of cable 66 interconnects the latch members 52 and 56 and a guide member 68 is provided for directing the pulling force of the cable at a right angle to the latch member 56. As can be best determined from FIG. 1, the notch 60 of the latch member 56 is elongated as compared to the notch formed in latch member 52 and a pulling force applied to the cable 64 will pivot the latch member 56 about the bolt 58 against the biasing force of the spring 62 and at the same time act through the cable segment 66 to pivot the latch member 52 about the bolt 53, against biasing force of spring 63, the difference in the notches of the latch members being such that the latch member 52 is first disengaged from the pin 50 before the latch member 56 is disengaged from the latch pin 54 permitting the bottom door to open.

In operation, after the spreader box is filled with material and the spreader is in the field on which the material is to be applied, the spreader is readied for the spreading operation by engaging the drives to the floor conveyor and heater. If the material is of such quality that there is a tendency for the material to pack under the beater, the cable 64 is pulled just far enough for the latch member 52 to be pivoted out of engagement with the latch pin 50 permitting the rear door 42 of the endgate to drop for providing additional clearance for the beater to alleviate the undesirable packing. When the beater can no longer effectively discharge the last of the material in the spreader box, the cable 64 is again pulled and this time it is pulled far enough to cause latch member 56 to be pivoted out of engagement with the latch pin 54 permitting the door 45 to drop open for allowing a conveyor 28 to discharge the last of the material.

If the material to be spread is of sufficient liquid quality that packing under the beater will not occur, the cable 66 may be removed so that only the bottom door 45 is opened by pulling on the cable 64.

While a preferred embodiment of the invention has been shown and described, it will be apparent that variations and modifications thereof may be made without departing from the underlying principles thereof.

We claim:

1. In combination with a manure spreader having a material carrying box open at its rear end and including a front and opposed upright sidewalls connected by a substantially horizontal floor terminating in a transverse edge at the rear open end; and a beater extending between and being rotatably supported by said sidewalls and extending rearwardly beyond the transverse edge, an endgate assembly comprising: opposed upright side panels respectively forming rearward extensions of said sidewalls, said panels having transversely aligned upper rear and lower rear corners spaced rearwardly of said beater; a transverse wall means fixedly interconnecting the panels and having opposite lateral edges contiguous with the panels; said wall means forming a rearward continuation of said floor, and terminating in a transverse rear edge extending between said lower rear corners, the rear transverse edge of said wall means and the edges connecting the upper and lower rear corners of said panels thus forming a discharge opening rearwardly of said beater; a transverse rear door dimensioned for closely fitting said discharge opening and being movably mounted between said panels for movement between a position wherein it closes said discharge opening and a position wherein it is clear of the discharge opening and said door when in said position closing said opening being located relative to said beater for permitting material to be discharged over the door.

2. The invention defined in claim 1 wherein the upper and lower rear corners of said panels are respectively located at horizontal levels slightly above and below that occupied by the axis of rotation of the beater and wherein said wall means extends upwardly as well as rearwardly with respect to said floor.

3. The invention defined in claim 1 wherein said wall means includes a transverse opening located generally vertically below said beater and a transverse lower door movably mounted for movement between a position wherein it blocks said transverse opening and a position wherein it is clear of said transverse opening.

4. The invention defined in claim 2 wherein said wall means includes a transverse opening located generally vertically below said beater and a transverse lower door movably mounted for movement between a position wherein it blocks said transverse opening and a position wherein it is clear of said transverse opening.

5. The invention defined in claim 2 wherein said rear door is vertically pivotally mounted for swinging about an axis extending along the transverse rear edge of said wall means, said transverse lower door forming the forward edge of said wall means and being vertically pivotally mounted for swinging movement about a transverse axis spaced rearwardly of the rear edge of said floor; and releasable latch means for holding said rear and lower doors in their closed positions.

6. The invention as set forth in claim 5 wherein the latch means includes a latch pin supported by each of the doors and extending transversely to one side of the spreader box and endgate, a first latch lever pivoted intermediately of its ends to the upright wall at said one side of the spreader box near the end of the spreader box and having an elongated notch formed in one end for receiving the latch pin of the first-mentioned door for retaining the door in the closed position, a tension spring connected to the other end of the latch lever for biasing the notch into engagement with the latch pin, a second latch lever pivoted intermediately of its ends to the endgate panel at said one side of the endgate and having a notch of less extent than said elongated notch formed in one end for receiving the latch pin of the second door for retaining the door in the closed position, a tension spring connected to the same end of the latch lever for biasing the notch into engagement with the latch pin, a first flexible member connecting the other ends of said first and second latch levers together and a second flexible member connected to said other end of said first latch lever and extending forwardly to the front of the spreader box whereby a pulling force on the second flexible member will be transmitted to the first latch lever and through the first flexible member to the second latch lever and will cause the latch levers to pivot so as to move the notches from engagement with the respective latch pin, the smaller notch of the second lever being removed from the latch pin for the second door before the elongated notch is removed from engagement with the latch pin of the first-mentioned door thus allowing the second door to be selectively opened before the first mentioned door is opened.

7. The invention as set forth in claim 5, wherein the latch means includes a single actuator for releasing the latch means from both doors.

8. The invention as set forth in claim 7 wherein the latch means includes a loss motion connection permitting release of one of the doors prior to release of the other door.

9. The invention as defined in claim 8 wherein the upper door releases before the lower door.

10. The invention defined in claim 4 wherein said rear door is vertically pivotally mounted for swinging about an axis extending along the transverse rear edge of said wall means, said transverse lower door forming the forward edge of said wall means and being vertically pivotally mounted for swinging movement about a transverse axis spaced rearwardly of the rear edge of said floor; and releasable latch means for holding said rear and lower doors in their closed positions.

11. The invention as set forth in claim 10 wherein the latch means includes a single actuator for releasing the latch means from both doors.

12. The invention as set forth in claim 11 wherein the latch means includes a loss motion connection permitting release of one of the doors prior to release of the other door.

13. The invention as defined in claim 12 wherein the upper door releases before the lower door.

14. The invention as set forth in claim 10 wherein the latch means includes a latch pin supported by each of the doors and extending transversely to one side of the spreader box and endgate, a first latch lever pivoted intermediately of its ends to the upright wall at said one side of the spreader box near the end of the spreader box and having an elongated notch formed in one end for receiving the latch pin of the first-mentioned door for retaining the door in the closed position, a tension spring connected to the other end of the latch lever for biasing the notch into engagement with the latch pin, a second latch lever pivoted intermediately of its ends to the endgate panel at said one side of the endgate and having a notch of less extent than said elongated notch formed in one end for receiving the latch pin of the second door for retaining the door in the closed position, a tension spring connected to the same end of the latch lever for biasing the notch into engagement with the latch pin, a first flexible member connecting the other ends of said first and second latch levers together and a second flexible member connected to said other end of said first latch lever and extending forwardly to the front of the spreader box whereby a pulling force on the second flexible member will be transmitted to the first latch lever and through the first flexible member to the second latch lever and will cause the latch levers to pivot so as to move the notches from engagement with the respective latch pin, the smaller notch of the second lever being removed from the latch pin for the second door before the elongated notch is removed from engagement with the latch pin of the first-mentioned door thus allowing the second door to be selectively opened before the first-mentioned door is opened.

15. An endgate assembly for use on a material spreader comprising a pair of opposite upright sidewalls, an inclined panel structure having upper rear and lower forward edges extending transversely between and fixedly attached to the sidewalls, upper and lower panels pivotally supported on said sidewalls to swing vertically with respect to the upper rear and lower forward edges, respectively, and latch means on the sidewalls for releasably latching the first panel in an upwardly directed position with respect to the upper rear edge and for latching the lower panel in a forwardly directed generally horizontal position with respect to the lower forward edge, and actuator means operatively connected to said latch means for selectively releasing the latch means from the panels.

16. The invention as defined in claim 15 wherein the latch means includes a loss motion connection therein permitting release of one of the panels prior to release of the other.

17. The invention as defined in claim 16 wherein the upper panel releases before the lower panel.

18. An endgate assembly for use in a material spreader comprising a pair of opposite upright sidewalls, horizontal pivot means having upper rear and lower forward edges extending transversely between and being fixedly attached to the sidewalls, first and second panels supported to swing vertically on the pivot means and latch means on the sidewalls for latching the first panel in an upwardly directed position with respect to the pivot means and for latching the second panel in a forwardly directed generally horizontal position with respect to the pivot means, and an actuator means operatively connected to the latch means for selectively releasing the latch means from the panels.

19. The invention as described in claim 18 wherein the latch means includes a lost motion connection therein preventing release of one of the panels prior to release of the other.

20. The invention as defined in claim 19 wherein the upper panel releases before the lower panel.

UNITED STATES PATENT OFFICE
CERTIFICATE OF CORRECTION

Patent No. 3,603,486       Dated 7 September 1971

Inventor(s) J. Clark Fickle, Paul Julius Thornbloom and Arnold Burton Skromme

It is certified that error appears in the above-identified patent and that said Letters Patent are hereby corrected as shown below:

Column 3, line 35, change "2" to -- 3 --.

Column 6, line 5, change "lost" to -- loss --.

Signed and sealed this 29th day of February 1972.

(SEAL)
Attest:

EDWARD M. FLETCHER, JR.
Attesting Officer

ROBERT GOTTSCHALK
Commissioner of Patents